United States Patent
Pineiro et al.

(10) Patent No.: US 8,676,871 B2
(45) Date of Patent: Mar. 18, 2014

(54) FUNCTIONAL UNIT CAPABLE OF EXECUTING APPROXIMATIONS OF FUNCTIONS

(75) Inventors: Alex Pineiro, Barcelona (ES); Thomas D. Fletcher, Portland, OR (US); Brian J. Hickmann, Sherwood, OR (US)

(73) Assignee: Intel Corporation, Santa Clara, CA (US)

(*) Notice: Subject to any disclaimer, the term of this patent is extended or adjusted under 35 U.S.C. 154(b) by 639 days.

(21) Appl. No.: 12/890,533

(22) Filed: Sep. 24, 2010

(65) Prior Publication Data

US 2012/0079250 A1 Mar. 29, 2012

(51) Int. Cl.
*G06F 1/02* (2006.01)

(52) U.S. Cl.
USPC .................................................. 708/270

(58) Field of Classification Search
USPC ................................. 708/270–277
See application file for complete search history.

(56) References Cited

PUBLICATIONS

Matula, David W., "Higher Radix Squaring Operations Employing Left-to-Right Dual Recoding", 2009, 19th IEEE International Symposium on Computer Arithmetic, pp. 39.

Oberman, et al. "A High-Performance Area-Efficient Multifunction Interpolator" Jun. 27-29, 2005, 17th IEEE International Symposium on Computer Arithmetic, pp. 17-24.

Pineiro, Jose-Alejandro, et al., "High-Speed Function Approximation Using a Minimax Quadratic Interpolator", IEEE Transactions on Computers, vol. 54, No. 3, Mar. 2005, pp. 304-318.

*Primary Examiner* — Tan V. Mai
(74) *Attorney, Agent, or Firm* — Blakely, Sokoloff, Taylor & Zafman LLP

(57) ABSTRACT

A semiconductor chip is described having a functional unit that can execute a first instruction and execute a second instruction. The first instruction is an instruction that multiplies two operands. The second instruction is an instruction that approximates a function according to $C0+C1X2+C2X2^2$. The functional unit has a multiplier circuit. The multiplier circuit has: i) a first input to receive bits of a first operand of the first instruction and receive bits of a C1 term of the second instruction; ii) a second input to receive bits of a second operand of the first instruction and receive bits of a X2 term of the second instruction.

16 Claims, 9 Drawing Sheets

FUNCTIONAL UNIT CAPABLE OF EXECUTING APPROXIMATIONS OF FUNCTIONS

FIELD OF INVENTION

The field of invention relates generally to electronic computing and more specifically, to a functional unit capable of executing approximations of functions.

BACKGROUND

FIG. 1 shows a generic processing core 100 that is believed to describe many different types of processing core architectures such as Complex Instruction Set (CISC), Reduced Instruction Set (RISC) and Very Long Instruction Word (VLIW). The generic processing core 100 of FIG. 1 includes: 1) a fetch unit 103 that fetches instructions (e.g., from cache and/or memory); 2) a decode unit 104 that decodes instructions; 3) a schedule unit 105 that determines the timing and/or order of instruction issuance to the execution units 106 (notably the scheduler is optional); 4) an execution stage 106 having execution units that execute the instructions (typical instruction execution units include branch execution units, integer arithmetic execution units (e.g., ALUs) floating point arithmetic execution units (e.g., FPUs) and memory access execution units); and 5) a retirement unit 107 that signifies successful completion of an instruction. Notably, the processing core 100 may or may not employ microcode 108. In the case of micro-coded processors, the micro-ops are typically stored in a non volatile machine readable medium (such as a Read Only Memory (ROM)) within the semiconductor chip that the processor is constructed on and cause the execution units within the processor to perform the desired function called out by the instruction.

FIG. 2 shows a process for calculating transcendental functions or other functions with an approximation as presently described. For any such function, having an input operand X of n bits, the input operand can be divided into two sections X1 and X2. Specifically, $X=[x_1, x_2, x_3, \ldots, x_{m-1}, x_m, x_{m+1}, x_{m+2}, \ldots x_n]=[X1, X2]$ where: $X1=[x_1, x_2, x_3, \ldots, x_{m-1}]$ and $X2=[x_m, x_{m+1}, x_{m+2}, \ldots x_n]$. From FIG. 2, X1 is used as an input parameter to a look-up table 201 that produces coefficients C0, C1 and C2 in response thereto. The X2 term is kept as an individual term, and, is also squared to produce an $X2^2$ term. The approximation takes the form of $f(X)=C0+C1X2+C2(X2^2)$ and is valid where $X1 \leq X < X1+2^{-m}$.

The formulation of FIG. 2 can be implemented in a processing core (such as any processing core 100 referred to above in FIG. 1) to approximate various functions (such as a reciprocal function (1/X) and others). Here, the different functions are realized with different sets of coefficient values. For example, a first portion of the look-up table contains sets of C0, C1 and C2 coefficients (as a function of X1) for a reciprocal function, a second portion of the look-up table contains C0, C1 and C2 coefficients (as a function of X1) for another function, etc. The value of m (which defines the size of X1 and therefore the number of entries for a given function in the look-up table 201) depends on the function being approximated and the target precision. More details concerning the implementation of the formulation of FIG. 2 may be found in Pinero, J-A., et. al., *High-Speed Function Approximation Using a Minimax Quadratic Interpolator, IEEE Transactions on Computers*, Vol. 54, No. 3, March, 2005.

FIGURES

The present invention is illustrated by way of example and not limitation in the figures of the accompanying drawings, in which like references indicate similar elements and in which.

Figure 7A:
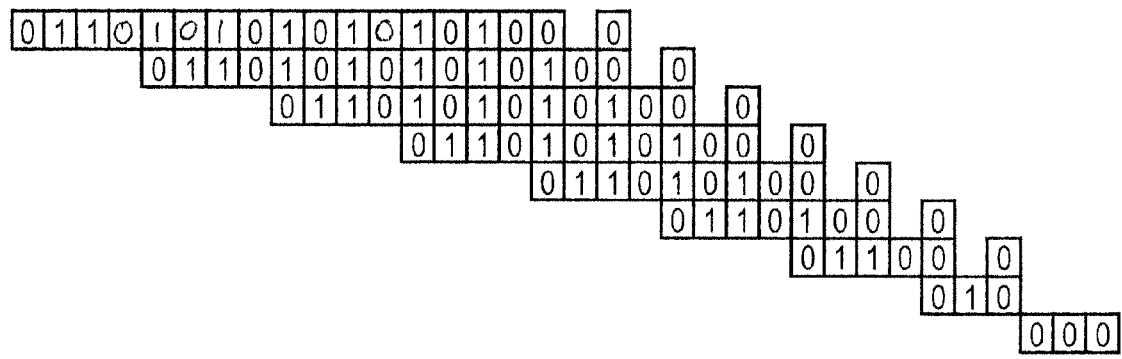
Figure 7B:
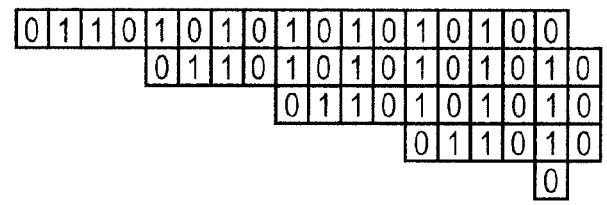
Figure 8:
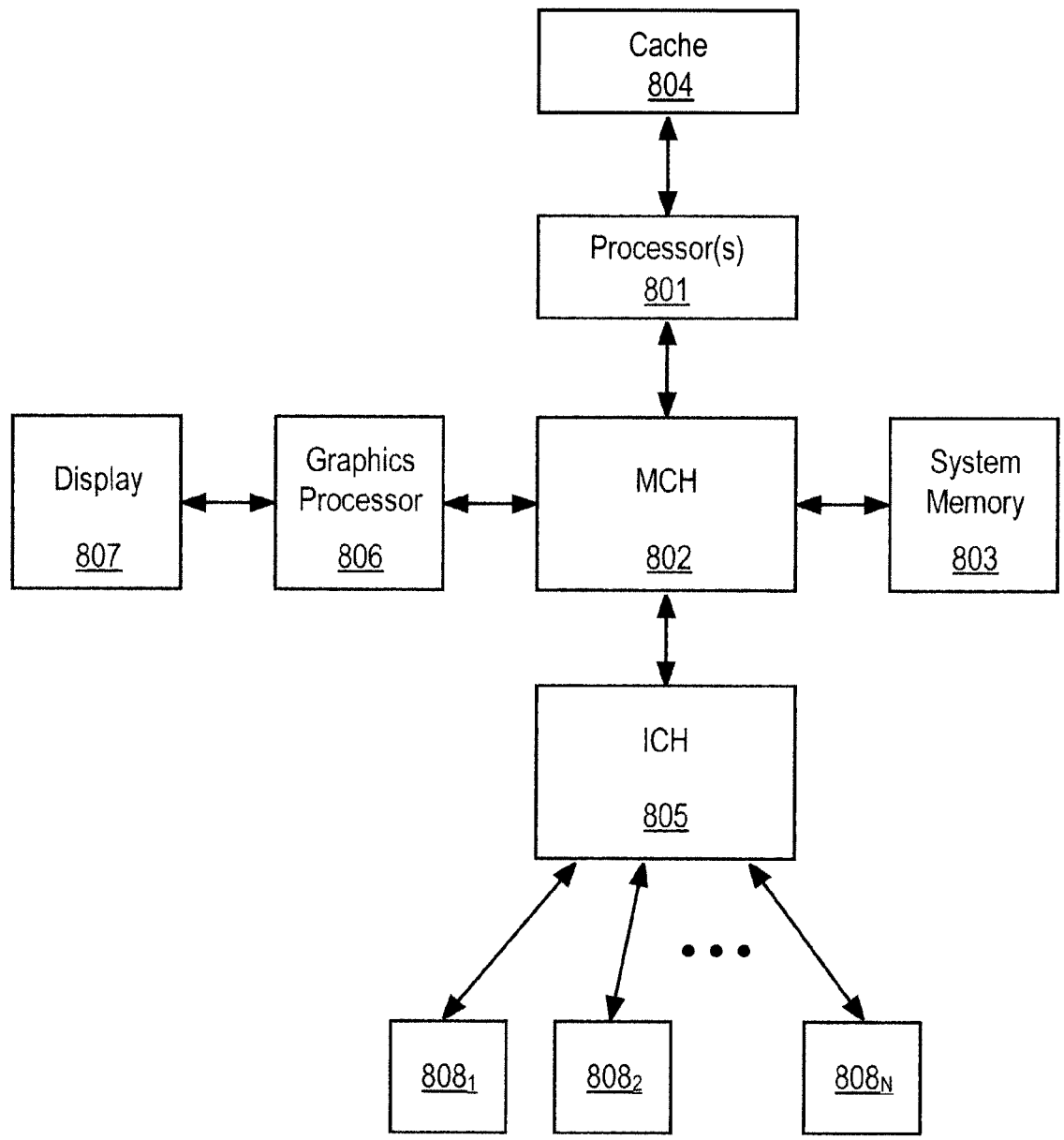

FIGS. 7a and 7b pertain to an implementation of a squarer;

FIG. 8 shows a computing system.

DETAILED DESCRIPTION

Figure 1:
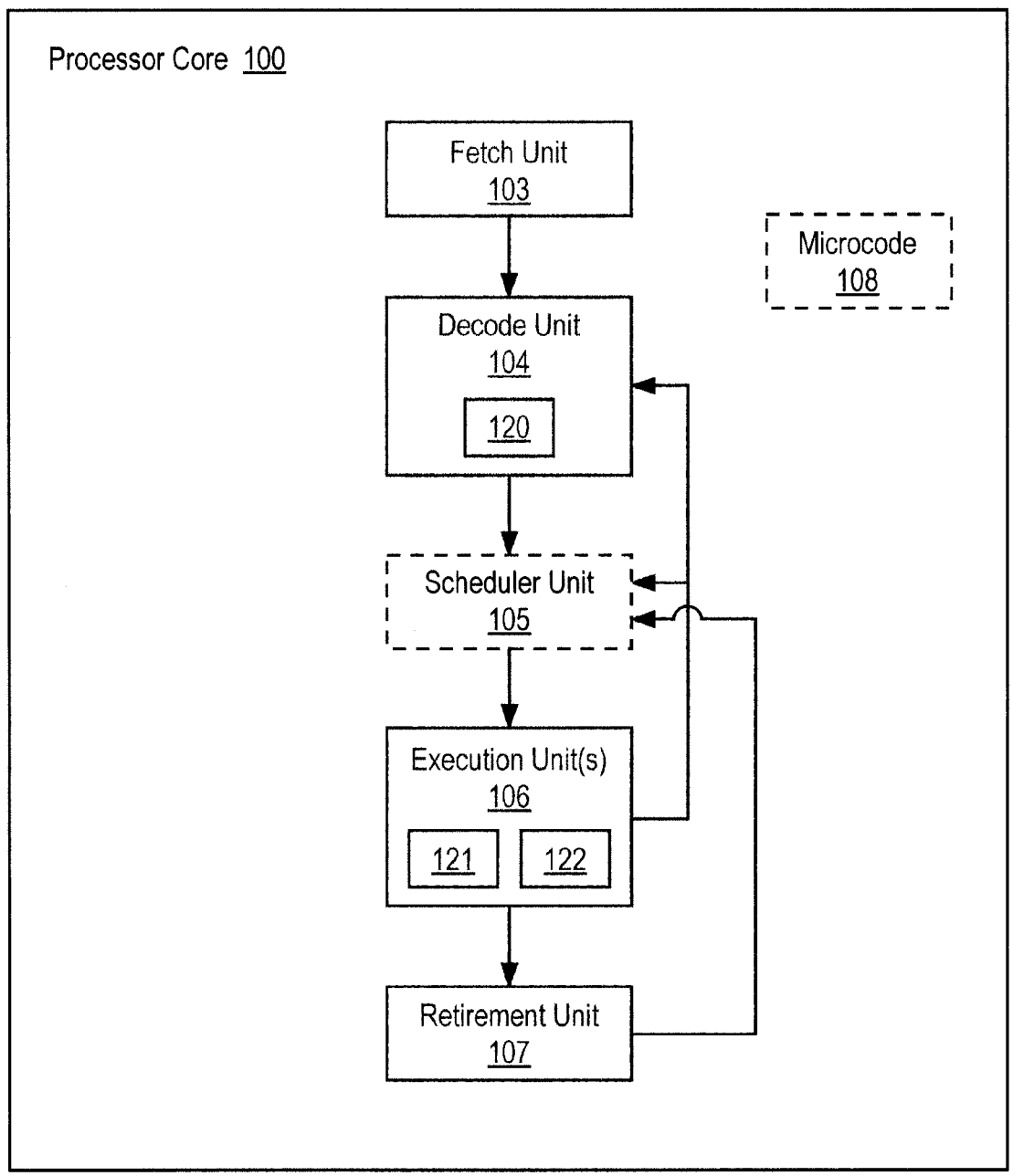
FIG. 1 shows a generic processor architecture.
Figure 2:
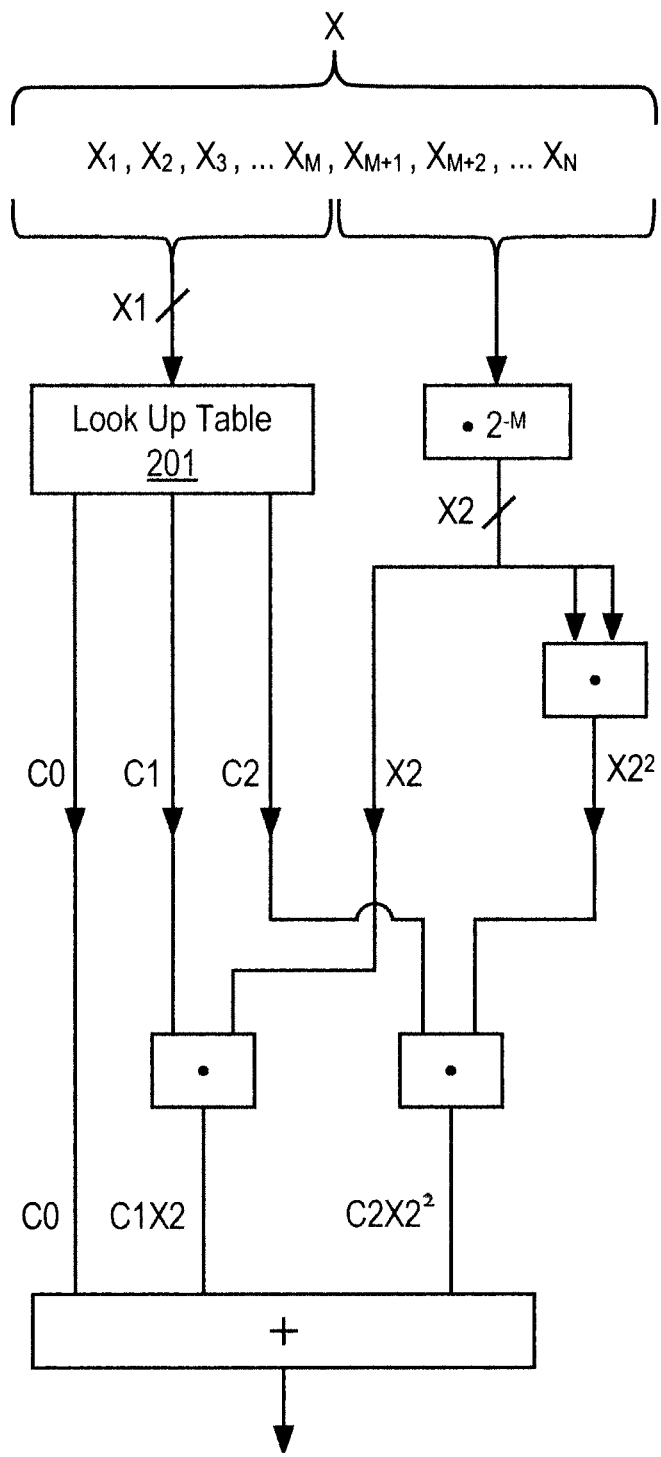
FIG. 2 shows a flow for approximating a mathematical function.
Figure 3:
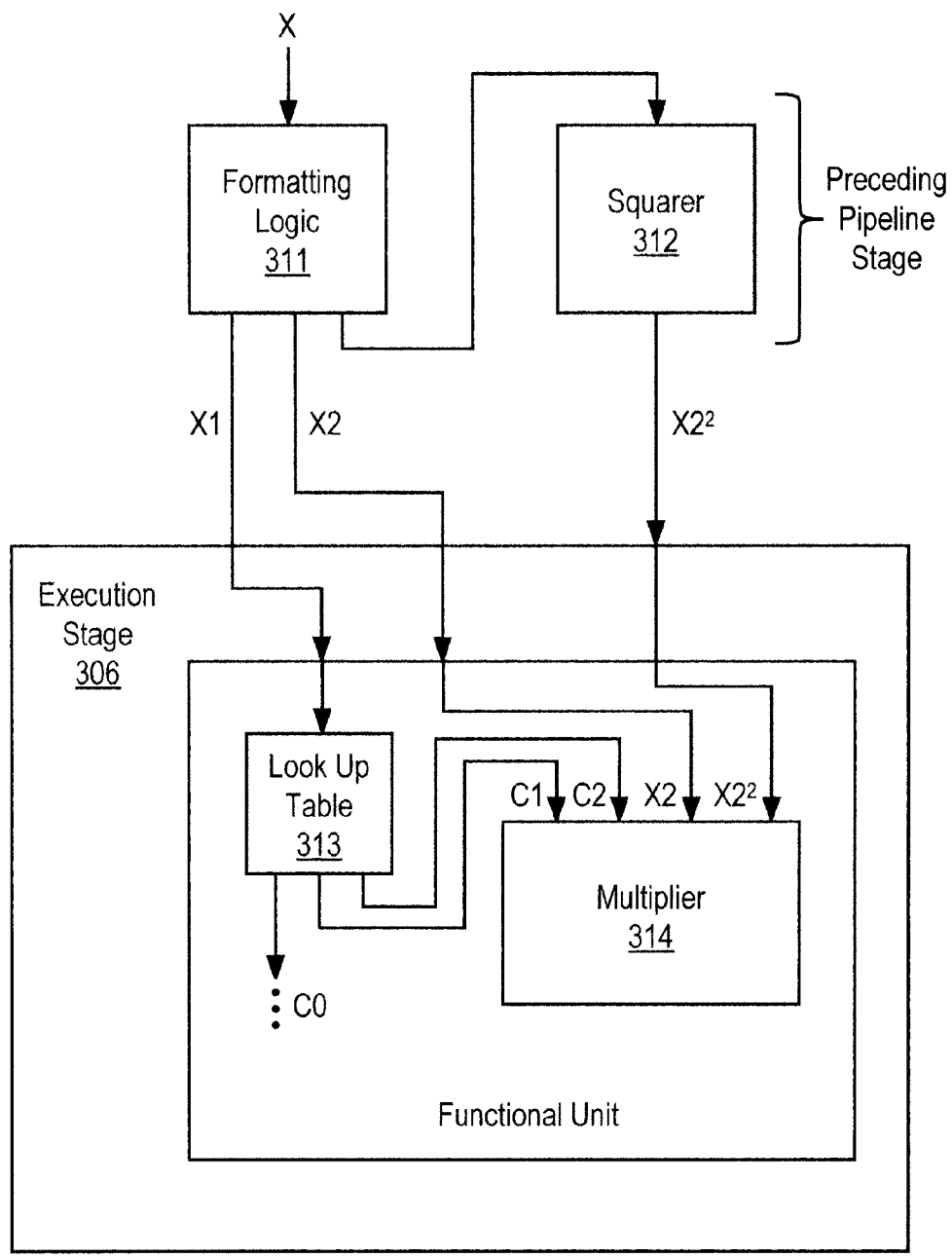
FIG. 3 shows a processor architecture that implements the approximation of FIG. 2.

FIG. 3 shows a portion of a processing core 300 having hardware elements 311 through 316 used to implement the formulation discussed just above. Here, formatting logic 311 is responsible for accepting the input X operand and dividing it into the X1 and X2 segments. The X2 segment is passed to squarer logic 312 that calculates the square of X2 (i.e., $X2^2$). The X1, X2 and $X2^2$ terms are then passed to the execution stage 306 as operands. Before discussing the execution stage 306 it is pertinent to point out that placing logic 311 and logic 312 in a pipeline stage that precedes the execution stage 306 enhances total throughput/performance of the overall calculation.

That is, if logic 311 and 312 were located in the execution stage 306, it would increase the propagation delay through the execution stage 306 for the calculation of the approximation. By contrast, moving logic 311 and 312 "higher up" in the pipeline to a pipeline stage that precedes the execution stage 306 permits the operation of logic 311 and/or 312 to take place in parallel (partially or completely) with the operations that are typically performed within another of the higher stage(s) so as to effectively hide the time cost of their operation. For example, if logic 311 and 312 are embedded in a scheduler, while the scheduler is scheduling an instruction that executes the approximation calculation, logic 311 may format the operand 311 and/or logic 312 may calculate the square of the X2 term.

It is worthwhile to note that a data fetch operation is typically associated with any processor architecture. Logic 311 and logic 312 may be placed anywhere downstream from the actual data fetch operation (since the operand X is fetched by the pipeline and logic units 311 and 312 subsequently act on information from the operand X). Depending on designer perspective, the data fetch operation may be viewed as its own pipeline stage that precedes the execution stage 306 or part of another stage (such as scheduler stage).

Within the execution stage 306 of FIG. 3, the look-up table 313 accepts the X1 term and produces the C0, C1 and C2 coefficients in response thereto. Here, the look-up table 313 may be implemented with various types of storage circuits such as a memory circuit (including but not limited to a Read-Only-Memory (ROM)). A multiplier 314 accepts the X2 and $X2^2$ terms and the C1 and C2 terms and calculates the $C1X2+C2(X2^2)$ partial products. These partial products are added to the C0 term to provide the final result. In alternative implementations, look up table 313 may be located in a pipeline stage that precedes the processor's execution stage and the C0, C1 and C2 coefficients are also passed to the processor's execution stage.

Figure 4:
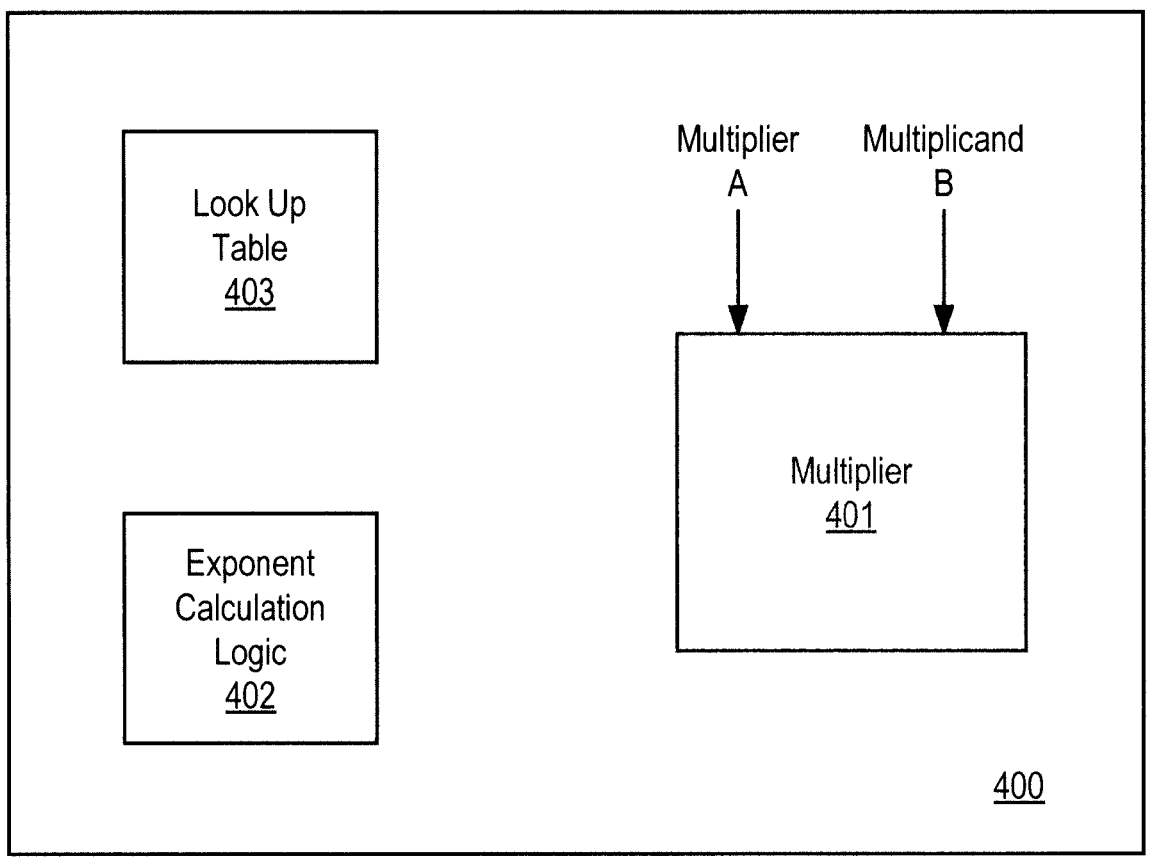
FIG. 4 shows an embodiment of a functional unit of a processor that implements the approximation of FIG. 2.

FIG. 4 shows an implementation of a functional unit 400 (for implementation within an execution stage) that is designed to not only calculate the approximation discussed above, but also integer and floating point multiplication instructions (MULT) and integer and floating point multiply add instructions (MADD). A MULT instruction multiplies a multiplier (A) with a multiplicand (B). That is, a MULT instruction calculates a result R=AB. A MADD instruction calculates a result R=AB+C (the C term is referred to as an addend). Here, MULT and MADD instructions are typically viewed as common instructions (that is, many processors have them). As such, the design of FIG. 4 can be seen as efficient in the sense that the multiplier 401 that is used to process a processor's MADD and MULT instructions is also used to process the processor's instructions that make use of an approximation calculation as described above.

As described in more detail immediately below, the manner in which the multiplier 401 operates depends on whether a MULT/MADD instruction is being executed, or, an instruction that makes use of an approximation is being executed. Execution of the MADD and MULT instructions will first be described. Functional unit 400 includes a multiplier 401 which multiplies an integer multiplier (A) with an integer multiplicand (B). In the case of integer MULT and integer MADD instructions, the multiplier and multiplicands are input operands to the functional unit 400. In the case of floating point MULT and floating point MADD instructions, the multiplier and multiplicand are the mantissa values of floating point A and B input operands that are presented to the functional unit 400. Separate exponent calculation logic 402 is used to calculate the exponent value for the floating point MULT and MADD instructions. For MADD instructions, the addend C is also presented as an input operand to the functional unit 400. In an embodiment, for floating point MULT and MADD instructions, the A and B terms are normalized as presented to the multiplier 401 are therefore not shifted by any shift logic.

MULT instructions are essentially MADD instructions with the addend C being forced to a value of 0. As such, in an embodiment, the functional unit 400 is said to be in "normal mode" when executing a MULT instruction or a MADD instruction, and, is said to be in "extended mode" when executing an instruction that calculates an approximation of a function.

Figure 5:
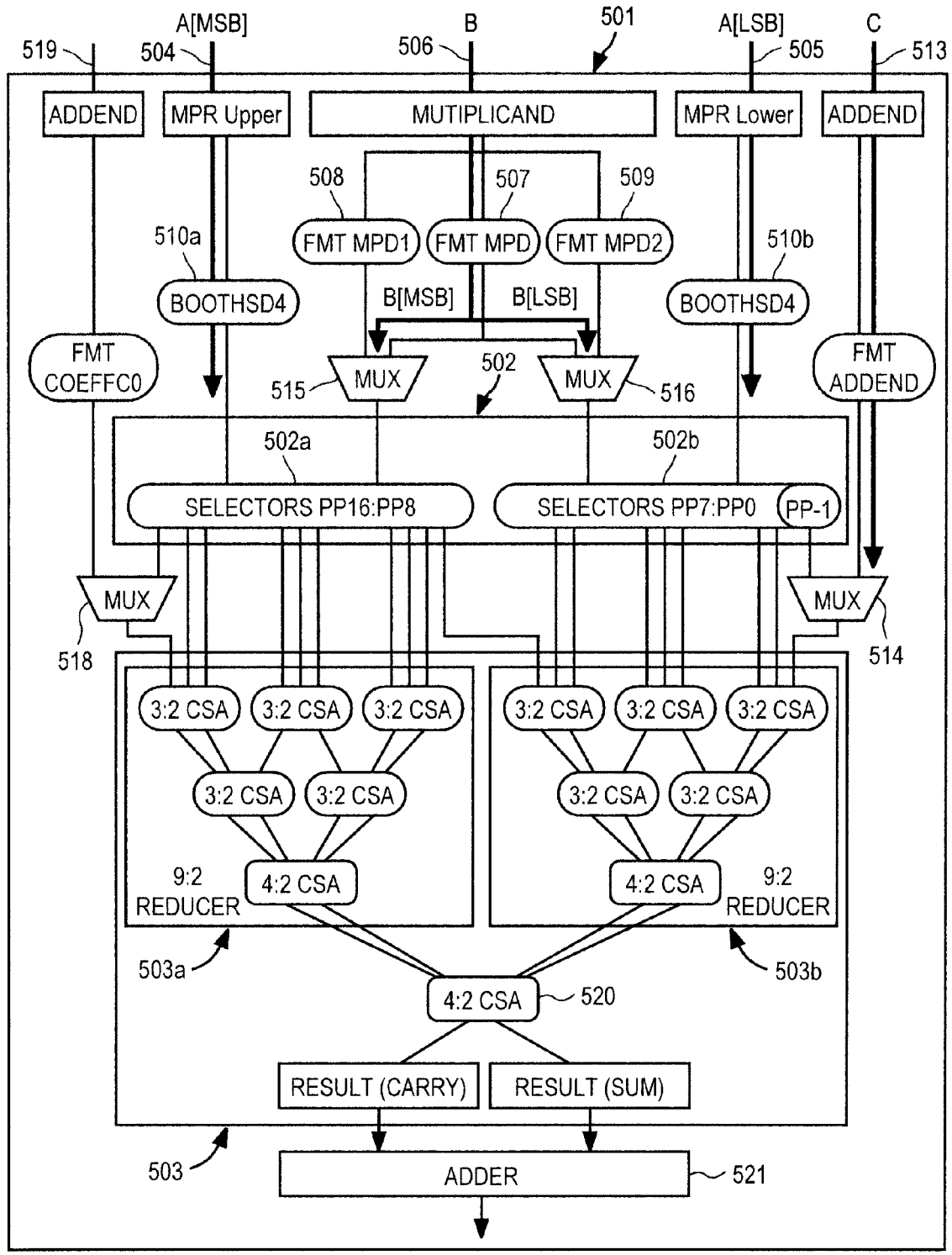
FIG. 5 shows an embodiment of the operation of the multiplier of FIG. 4 in a "normal mode"

FIG. 5 shows an embodiment 501 of the multiplier 401 of FIG. 4 and its operation in normal mode. As is known in the art, a multiplier can be built from selector logic circuitry (that calculates partial product terms for the multiplication) followed by Wallace tree logic circuitry (that adds the partial product terms). The multiplier structure 501 of FIG. 5, however, is believed to be new at least because both the selector circuitry 502 and the Wallace tree circuitry 503 have been split into separate sections. Specifically, the selector logic 502 is split into separate selectors 502a and 502b and the Wallace tree logic 503 is split into separate Wallace tree sections 503a and 503b.

The most significant bits of the multiplier (A[msb]) are provided at input 504 and the least significant bits of the multiplier (A[lsb]) are provided at input 505. The multiplicand (B) is provided at input 506 and is divided into a most significant bits portion (B[msb]) and a least significant bits portion (B[lsb]) by normal mode formatting logic 507. Here, extended mode formatting logic 508, 509 is not used. Multiplexers 515, 516 whose channel select inputs are controlled by whether the functional unit is in normal or extended mode, enable application of formatting logic 507 and disable application of formatting logic 508, 509 when the functional unit is in normal mode. With the submission of the most significant portions of the multiplier and multiplicand being provided to selector section 502a, and, the least significant portions of the multiplier and multiplicand being provided to selector section 502b, selector section 502a will determine higher ordered partial product terms (that is, partial product terms involving only the more significant bits of A and B) and selector section 502b will determine lower ordered partial product terms (that is, partial product terms involving only the less significant bits of A and B).

As observed in FIG. 5, each of the multiplier sections (A[msb] and A[lsb]) are Booth encoded by Booth encoders 510a, 510b. Owing to the presence of the Booth encoders, every two bits of the separate multiplier terms A[msb], A[lsb] may correspond to one row in the partial product summation performed by its respective Wallace tree section. As such, the number of partial products calculated by each selector section 502a, 502b is about half the number of bits of each of the operands A[msb], A[lsb] provided to each selector section (for example, in an embodiment where A is 32 bits and B is 32 bits, selector 502a produces partial products 16 through 8, and, selector 502b produces partial products 7 through 0). In an embodiment, each partial product term is also hard wired so as to be effectively shifted two bits to the left. Encoding the multiplier with Booth encoding and the corresponding reduction of the number of partial product terms to nearly half the number of bits in the multiplicand/multiplier and the left shift by two of the partial product terms is a known multiplication process referred to as "Radix-4" multiplication. However, such multiplication is not known to have been applied to divided selector and Wallace tree portions as described herein.

In the case of integer MADD instructions, an addend term C is entered at input 513 and injected into Wallace tree section 503b for summation. Here, a multiplexer 514 whose channel select is determined by whether the functional unit is acting in normal mode or extended mode selects input 513 (integer addend C) for normal mode. The lowest ordered partial product is not selected by multiplexer 514 and is effectively ignored. In the case of integer MULT instructions, a value of 0 is forced on the integer addend C term. In the case of integer MADD instructions, the C integer addend term is its operand value. In an embodiment, for floating point MADD instructions, the C addend term is not provided to the multiplier 501 but instead added to the multiplier output by an adder (not shown) that follows the multiplier. In an alternative embodiment, a floating point C addend term (mantissa) may be presented to input 513 for floating point MADD instructions where the mantissa is shifted by shift logic (not shown) prior to its presentation at input 513, in view of comparisons made by the exponent logic 402 of the exponent of the C term and the exponent of the AB term. Specifically, the C addend may be shifted to the left by the difference between C.exp and AB.exp if C.exp>AB.exp. Alternatively, the C addend may be shifted to the right by the difference between AB.exp and C.exp if AB.exp>C.exp. Another multiplexer 518 whose channel select is determined by whether the functional unit is in normal mode or extended mode selects the highest ordered partial product term for inclusion in the Wallace tree and ignores whatever is present at input 519.

Each of the Wallace tree sections 503a, 503b include trees of carry sum adders ("CSA"). The number of carry sum adders may vary from embodiment with the number of partial products and size of the A and B operands. Each of the Wallace tree sections 503a, 503b calculate final respective sum and carry terms that are provided to an output carry sum adder 520. The sum and carry terms produced by adder 520 are added by adder 521 to produce a final result for integer MULT and integer MADD instructions, and, a final mantissa result for floating point MULT and floating point MADD instructions. Referring back to FIG. 4, in the case of floating point MULT and MADD instructions, exponent calculation logic 402 determines the exponent of the final result. In an embodiment, the exponent of the result is the greatest of: i) the exponent of C (C.exp); ii) the exponent of AB (=A.exp+ B.exp).

Figure 6A:
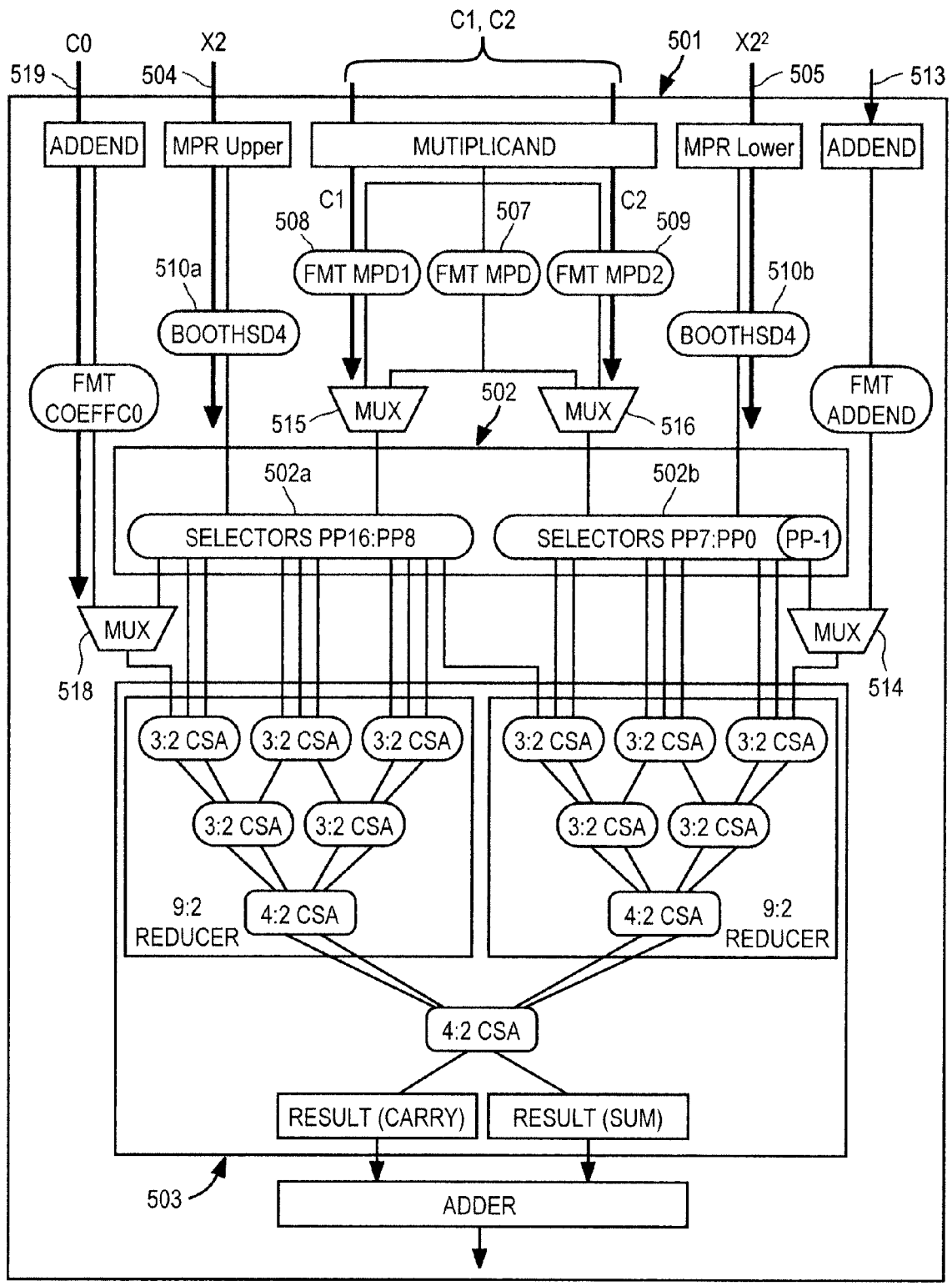
FIGS. 6a and 6b show an embodiment of the operation of the multiplier of FIG. 4 in an "extended mode"

FIG. 6a shows the same multiplier in enhanced mode when the multiplier is instead used to calculate the C0+C1X2+C2 (X2$^2$) approximation. Referring briefly back to FIG. 4, recall that the X1, X2 and X2$^2$ operands are provided to the functional unit 400. The X1 operand is used as a look-up parameter into look-up table (e.g., ROM) 403 which provides the C0, C1, C2 coefficients. As the C0, C1 and C2 coefficients correspond to a specific function that is to be approximated, in an embodiment where the functional unit 400 supports the approximation of a number of different functions, some additional information is provided to the functional unit 400 which specifies the specific function (and therefore a specific section of the look-up table 403) so that the look-up table presents coefficients for the correct function. In an embodiment, operation in enhanced mode is performed as an integer operation. As such, the C0, C1 and C2 coefficients, and, the X2 and X2$^2$ terms are presented to the multiplier 401 as integers. In an embodiment, any/all of these terms are shifted by shift logic (not shown) by the relative differences in their order so that they are "aligned" correctly in relation to the binary point when presented to the multiplier 401.

Referring to FIG. 6a, coefficient C0 is presented at input 519 and multiplexer 518 injects C0 into the Wallace tree for summation. The X2 term is submitted to selector portion 502a in place of the A[msb] term and the X2$^2$ term is submitted to selector portion 502b in place of the A[lsb] term. That is, in the embodiment of FIG. 6a, the "multiplier" takes the form of the X2 and X2$^2$ terms concatenated together (i.e., multiplier=[X2, X2$^2$]). Similarly, in the embodiment of FIG. 6a, the C1 term takes the place of the B[msb] term and the C2 term takes the place of the B[lsb] term (i.e., multiplicand= [C1, C2]). The addend input 513 is ignored as multiplexer 514 selects the lowest ordered partial product from selector portion 502b and injects it into Wallace tree portion 503b for summation. With respect to the C1 and C2 terms, multiplexers 515, 516 select the output of formatting logic 508, 509 instead of formatting logic 507.

Considering normal operation again briefly, the partial products are aligned to represent typical multiplication in which increasingly larger partial product terms are stacked upon one another and added. Here, as in standard multiplication, the product values of the partial products move out to the left going down the stack as more and more 0s are added to their right (noting that the addition of zeros may be accomplished in hardware simply by aligning/shifting the partial product to the left). By contrast, in enhanced mode, the partial products are shifted so that they are correctly aligned for the summation of the C0+C1X2+C2(X2$^2$) approximation.

Figure 6B:
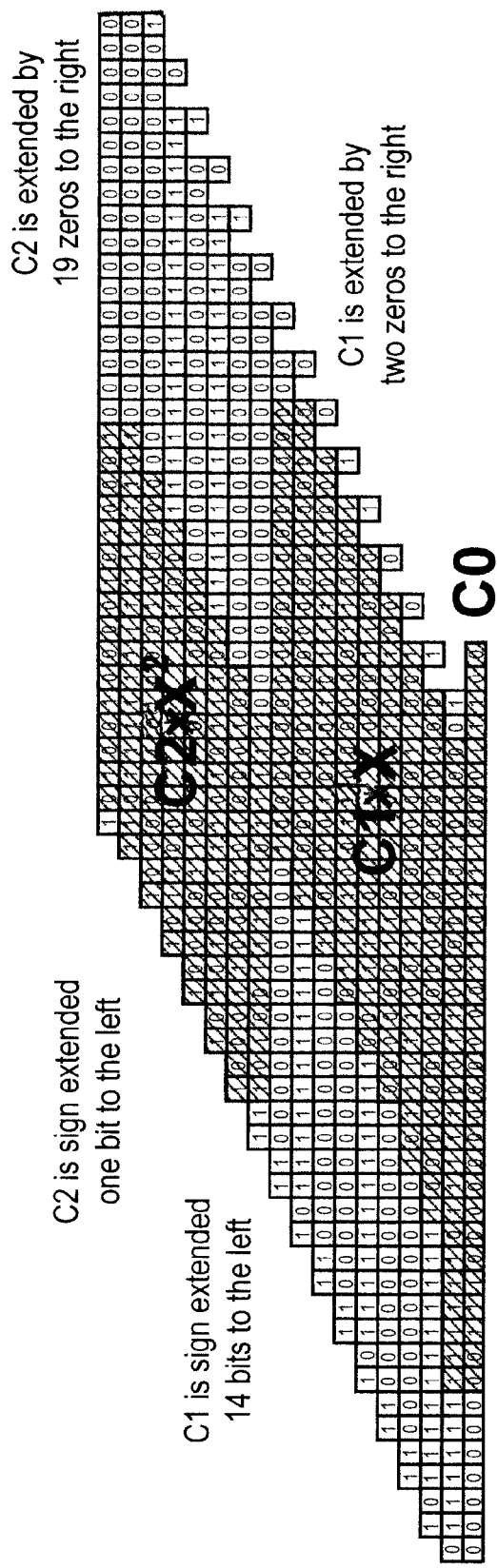

FIG. 6b shows an example of the alignment. Notably, the partial product terms produced by selector section 502b (for the C2(X2$^2$) term) are shifted to the left (note the appended zeroes to their right) and the partial product terms produced by selector section 502a (for the C1X2 term) are shifted to the right (note the appended zeroes to their left). In normal operation, the partial product terms produced by selector section 502b correspond to lower order terms and the partial product terms produced by selector 502a correspond to higher order terms. Hence, in normal mode, when viewed from an aligned perspective, the terms produced by selector 502a tend to be the left of the terms produced by selector 502b.

By contrast, in enhanced mode, the partial product terms produced by the two selector sections 502a, 502b are closer in order. Thus, to effect the correct alignment, the partial products produced by selector 502b are increased (relative to normal mode) by shifting them further to the left, and, the partial products produced by selector 502a need to decreased (relative to normal mode) by shifting them to the right. Recall that, in normal mode formatting logic 507 is utilized, while, in extended mode, formatting logic 508, 509 is utilized. In an embodiment, differences between the formatting between the two modes include the shifting of the multiplicand in enhanced mode to effect the alignment described just above. Specifically, in an embodiment, as depicted in FIG. 6b, format logic 508 shifts C1 to the right (by sign extending on the left) and format logic 509 shifts C2 to the left (by padding zeros on the right).

Referring back to FIG. 3, recall the use of the squarer logic 312. In an embodiment, squarer logic 312 is implemented as a Radix-4 multiplier in which the multiplier is Booth encoded and partial product terms are shifted two bits to the left. However, because a square operation is being performed (multiplicand=multiplier=X2), the partial product array can be "folded" resulting in another factor of two reduction in partial product terms. As such, whereas the multiplier of FIGS. 5 and 6a,b reduced the number of partial product terms to approximately half of the number of bits of the multiplier/ multiplicand, in the case of the squarer, the number of partial product terms is reduced to approximately a fourth of the number of bits in the X2 term. In an embodiment, for an X2 term of 32 bits, the partial product array can be folded into only nine partial product terms as observed in FIG. 7a. Even further reduction of semiconductor surface area can be obtained if smaller order partial product terms are effectively ignored such that portion 701 of the array in FIG. 7a is eliminated leaving only the array structure of FIG. 7b being implemented in circuitry. The partial product terms of FIG. 7b produced by selector logic of the squarer may then be added by 4:2 carry sum adder logic (which may be implemented as 5:3 carry sum logic where a fast carry output is absorbed by a neighboring carry sum adder).

As discussed above, a number of different functions can be approximated with the C0+C1X2+C2(X2$^2$) approximation. As such, a number of different instructions that make use of different approximated functions can be executed from the enhanced mode. For instance, according to one embodiment, separate instructions are supported for each of the following calculations: i) 1/X; ii) 1/(X$^{1/2}$); iii) 2$^X$; and, iv) log$_2$(X). For each of these individual instructions, separate tables of coefficient values may exist in the look-up table 313/403. Processing for each of these instructions is as described above with the exception of the following instruction specific operations (note that in floating point form, X, can be expressed as [X.sgn][X.mant][X.exp] where X.sgn is the sign of X, X.mant is the mantissa of X and X.exp is the exponent of X).

In an embodiment of a 1/X instruction, 1/X=X$^{-1}$ which, when written in floating point form, corresponds to (X.sgn) ((X.mant)(2$^{\wedge}$X.exp))$^{-1}$=(X.sgn)(2$^{\wedge}$−X.exp)(approx. of 1/(X.mant)). Here, coefficients for f(x)=1/x are stored in look-up table 403 and used to calculate (approx. of 1/(X.mant)). Exponent logic 402 simply presents−X.exp as the exponent of the result.

In an embodiment of a 1/(X$^{1/2}$) instruction, where X.exp is understood to be unbiased and noting that X.sgn must be positive, 1/(X$^{1/2}$)=X$^{-1/2}$=((X.mant)(2$^{\wedge}$X.exp))$^{-1/2}$=(2$^{\wedge}$− X.exp/2)(approx. of 1/(X.mant$^{1/2}$)). Here, coefficients for f(x)=1/(x$^{1/2}$) are stored in look-up table 403 and used to calculate (approx. of 1/(X.mant$^{1/2}$)). Exponent logic 402 simply presents $-X.exp/2$ in the case where X.exp is even and $-(X.exp-1)/2$ in the case where X.exp in odd (which effectively corresponds to presenting the rounded down version of $(2^\wedge-X.exp/2)$.

In an embodiment, in order to calculate $2^X$, a first instruction is executed that converts X in floating point form to a two's complement signed fixed-point number. In an embodiment, the signed-fixed point number has an 8 bit integer part I_X and a 24 bit fractional part F_X. 2X can be expressed as $2^{I\_X}[approx. (2^{F\_X})]$. As such, after execution of the first instruction, X=F_X and C0, C1 and C2 coefficients for $f(x)= 2^X$ are looked up from the look up table (using an X1 portion of F_X) and presented to the multiplier which also accepts X2 and $X2^2$ (from the X2 portion of F_X). The mantissa of the result corresponds to [approx. $(2^{F\_X})$] and the exponent of the result is provided by exponent logic 402 as I_X.

In an embodiment of a $\log_2(X)$ instruction, $\log_2(X)=\log_2((2^\wedge X.exp)(X.mant))=X.exp+[approx(\log_2(X.mant)]$. Coefficients for $f(x)=\log_2(x)$ are looked up from the look up table and presented to the multiplier. The multiplier calculates [approx($\log_2(X.mant)$)] and an adder (not shown) that is coupled to the output of the multiplier adds the multiplier result to the X.exp term.

A processor having the functionality described above can be implemented into various computing systems as well. FIG. 8 shows an embodiment of a computing system (e.g., a computer). The exemplary computing system of FIG. 8 includes: 1) one or more processors 801 that may be design to include a vector logical reduction instruction; 2) a memory control hub (MCH) 802; 3) a system memory 803 (of which different types exist such as DDR RAM, EDO RAM, etc,); 4) a cache 804; 5) an I/O control hub (ICH) 805; 6) a graphics processor 806; 7) a display/screen 807 (of which different types exist such as Cathode Ray Tube (CRT), flat panel, Thin Film Transistor (TFT), Liquid Crystal Display (LCD), DPL, etc.) one or more I/O devices 808.

The one or more processors 801 execute instructions in order to perform whatever software routines the computing system implements. The instructions frequently involve some sort of operation performed upon data. Both data and instructions are stored in system memory 803 and cache 804. Cache 804 is typically designed to have shorter latency times than system memory 803. For example, cache 804 might be integrated onto the same silicon chip(s) as the processor(s) and/or constructed with faster SRAM cells whilst system memory 803 might be constructed with slower DRAM cells. By tending to store more frequently used instructions and data in the cache 804 as opposed to the system memory 803, the overall performance efficiency of the computing system improves.

System memory 803 is deliberately made available to other components within the computing system. For example, the data received from various interfaces to the computing system (e.g., keyboard and mouse, printer port, LAN port, modem port, etc.) or retrieved from an internal storage element of the computing system (e.g., hard disk drive) are often temporarily queued into system memory 803 prior to their being operated upon by the one or more processor(s) 801 in the implementation of a software program. Similarly, data that a software program determines should be sent from the computing system to an outside entity through one of the computing system interfaces, or stored into an internal storage element, is often temporarily queued in system memory 803 prior to its being transmitted or stored.

The ICH 805 is responsible for ensuring that such data is properly passed between the system memory 803 and its appropriate corresponding computing system interface (and internal storage device if the computing system is so designed). The MCH 802 is responsible for managing the various contending requests for system memory 803 access amongst the processor(s) 801, interfaces and internal storage elements that may proximately arise in time with respect to one another.

One or more I/O devices 808 are also implemented in a typical computing system. I/O devices generally are responsible for transferring data to and/or from the computing system (e.g., a networking adapter); or, for large scale non-volatile storage within the computing system (e.g., hard disk drive). ICH 805 has bi-directional point-to-point links between itself and the observed I/O devices 808.

In the foregoing specification, the invention has been described with reference to specific exemplary embodiments thereof. It will, however, be evident that various modifications and changes may be made thereto without departing from the broader spirit and scope of the invention as set forth in the appended claims. The specification and drawings are, accordingly, to be regarded in an illustrative rather than a restrictive sense.

What is claimed:
1. A semiconductor chip comprising:
an instruction execution pipeline comprising:
a) instruction fetch stage circuitry;
b) instruction decode stage circuitry;
c) execution stage circuitry comprising a functional unit to execute a first instruction and execute a second instruction, said first instruction being an instruction that multiplies two operands, said second instruction being distinct from said first instruction and being an instruction that approximates a function according to $C0+C1X2+C2X2^2$, said functional unit having a multiplier circuit, said multiplier circuit having:
i) a first input to receive bits of a first operand of said first instruction and receive bits of a C1 term of said second instruction, wherein a first datapath exists downstream from said first input for said first instruction and a second datapath exists downstream from said first input for said second instruction, wherein said first and second datapaths include different formatting logic;
ii) a second input to receive bits of a second operand of said first instruction and receive bits of a X2 term of said second instruction.
2. The semiconductor chip of claim 1 wherein said multiplier comprises a first selector and a second selector, said first and second inputs feeding one of said selectors.
3. The semiconductor chip of claim 2 wherein said first selector feeds a first Wallace tree circuit and said second selector feeds a second Wallace tree circuit.
4. The semiconductor chip of claim 1 wherein said multiplier circuit also has:
i) a third input to receive other bits of said first operand of said first instruction and receive bits of a C2 term of said second instruction;
ii) a fourth input to receive bits of said second operand of said first instruction and receive bits of a $X2^2$ term of said second instruction.
5. The semiconductor chip of claim 1 wherein said multiplier circuit had a fifth input to receive said C0 term and a data path line flowing from said fifth input into one of said Wallace tree circuits.
6. The semiconductor chip of claim 5 wherein said first instruction is a MADD instruction and said multiplier circuit had a sixth input to receive an addend term for said first instruction and a data path line flowing from said sixth input into one of said Wallace tree circuits.

7. A computing system, comprising:
a processor comprising:
an instruction execution pipeline comprising:
   a) instruction fetch stage circuitry;
   b) instruction decode stage circuitry;
   c) execution stage circuitry comprising a functional unit to execute a first instruction and execute a second instruction, said first instruction being an instruction that multiplies two operands, said second instruction being distinct from said first instruction and being an instruction that approximates a function according to $C0+C1X2+C2X2^2$, said functional unit having a multiplier circuit, said multiplier circuit having a first alignment of partial product terms for said first instruction and a second alignment of partial product terms for said second instruction, said second alignment having shifted partial product terms relative to said first alignment.

8. The computing system of claim 7 wherein said multiplier comprises a first selector and a second selector, wherein first and second inputs of said multiplier feed one of said selectors, said first input to receive bits of a first operand of said first instruction and receive bits of a C1 term of said second instruction, said second input to receive bits of a second operand of said first instruction and receive bits of a X2 term of said second instruction.

9. The computing system of claim 8 wherein said first selector feeds a first Wallace tree circuit and said second selector feeds a second Wallace tree circuit.

10. The computing system of claim 8 wherein said multiplier circuit also has:
   i) a third input to receive other bits of said first operand of said first instruction and receive bits of a C2 term of said second instruction;
   ii) a fourth input to receive bits of said second operand of said first instruction and receive bits of a $X2^2$ term of said second instruction.

11. The computing system of claim 10 wherein said multiplier circuit had a fifth input to receive said C0 term and a data path line flowing from said fifth input into one of said Wallace tree circuits.

12. A method comprising:
fetching a first instruction;
decoding said first instruction;
executing said first instruction by multiplying a multiplier term and a multiplicand term with multiplier circuitry in an execution stage;
fetching a second instruction, said second instruction to approximate a function by executing an equation of the form $C0+C1X2+C2X2^2$;
decoding said second instruction;
executing said second instruction by multiplying a first term composed of said X2 and $X2^2$ terms with a second term composed of said C1 and C2 terms with said multiplier.

13. The method of claim 12 wherein said first instruction is a multiply instruction.

14. The method of claim 12 wherein said first instruction is a multiply-add instruction.

15. The method of claim 12 wherein said second instruction approximates the function 1/X.

16. The method of claim 12 wherein said multiplier in executing said second instruction aligns partial product terms that are shifted relative to said multiplier's alignment of partial product terms during execution of said first instruction.

* * * * *